(12) United States Patent
Nelson (10) Patent No.: US 7,773,204 B1
(45) Date of Patent: Aug. 10, 2010

(54) APPARATUS AND METHOD FOR SPATIAL ENCODING OF A SEARCH SPACE

(75) Inventor: Robert Sigurd Nelson, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 308 days.

(21) Appl. No.: 12/039,531

(22) Filed: Feb. 28, 2008

Related U.S. Application Data (63) Continuation-in-part of application No. 11/499,969, filed on Jul. 20, 2006, now Pat. No. 7,589,827.

(51) Int. Cl.
*G01C 3/08* (2006.01)
(52) U.S. Cl. .................................................... 356/5.02
(58) Field of Classification Search ........ 356/3.01–28.5
See application file for complete search history.

(56) References Cited

U.S. PATENT DOCUMENTS

| | | | |
|---|---|---|---|
| 4,218,987 A | 8/1980 | Park et al. | |
| 4,227,476 A | 10/1980 | Park et al. | |
| 4,649,275 A | 3/1987 | Nelson et al. | |
| 4,700,301 A * | 10/1987 | Dyke ............................ | 701/25 |
| 4,767,928 A | 8/1988 | Nelson et al. | |
| 4,829,184 A | 5/1989 | Nelson et al. | |
| 4,948,974 A | 8/1990 | Nelson et al. | |
| 6,288,974 B1 | 9/2001 | Nelson | |
| 2003/0214610 A1 * | 11/2003 | George ............................ | 348/745 |
| 2005/0195383 A1 * | 9/2005 | Breed et al. ................ | 356/4.01 |
| 2007/0070808 A1 | 3/2007 | Ray et al. | |

OTHER PUBLICATIONS

Frederic Lizzi, Mary Rorke, Joan Sokil-Melgar, Andrew Kalisz, and Jack Driller, Interfacing very-high-frequency transducers to digital-acquisition scanning systems; SPIE vol. 1733, 1992.
M. Fink, Object Detection and Imaging with Acoustic Time Reversal Mirrors, SPIE vol. 1942, pp. 256-267, 1993.
C. Nagasawa, M. Abo, J. Yamamoto, and O. Uchino, Random modulation cw lidar using new random sequence; Applied Optics, vol. 29, No. 10, pp. 1466-1470, 1990.
J. Briers, Laser Doppler and time-varying speckle: a reconciliation, J. Opt. Soc. Am. A, vol. 13, No. 2, pp. 345-350, 1996.
J. Liu, et al., Laser Doppler and time-varying speckle: a reconciliation; IEEE Trans Medical Imaging, vol. 8, No. 2, pp. 168-172, 1989.

* cited by examiner

*Primary Examiner*—Thomas H Tarcza
*Assistant Examiner*—Luke D Ratcliffe
(74) *Attorney, Agent, or Firm*—Kyle Eppele; J. Eric Anderson (57) ABSTRACT

Spatial encoding of a search space is achieved by an array of radiation or acoustic energy detectors receiving data from at least one radiation or energy source. At least one radiation source capable of providing a predetermined type of radiation is used. The radiation may be in the form of a plurality of beams arrayed along at least one directional axis, and arranged in successive alignment to exhibit a directional component. The directional component is characterized by a frequency variance between successive beams in accordance with direction and disposed so radiation therefrom propagates within the search space. At least one radiation detector capable of detecting the radiation is provided, and is disposed to detect at least that type of radiation.

18 Claims, 4 Drawing Sheets

APPARATUS AND METHOD FOR SPATIAL ENCODING OF A SEARCH SPACE

CROSS-REFERENCE TO RELATED APPLICATION

This application is a continuation-in-part of U.S. patent application Ser. No.: 11/499,969, filed 20 Jul. 2006, now U.S. Pat. No. 7,589,827 entitled "System and Method for Detecting an Object in a Search Space" (Navy Case # 83775), hereby incorporated by reference herein in its entirety for its teachings.

FEDERALLY-SPONSORED RESEARCH AND DEVELOPMENT

This invention (Navy Case No. 98291) was developed with funds from the United States Department of the Navy. Licensing inquiries may be directed to Office of Research and Technical Applications, Space and Naval Warfare Systems Center, San Diego, Code 2112, San Diego, Calif., 92152; telephone (619)553-2778; email: T2@spawar.navy.mil.

FIELD OF THE INVENTION

The present invention relates to the detection or detection and tracking of objects within a search space of a fixed or moving site. Such detection can be used to detect objects associated with a platform such as a vessel or a plane; a structure such as a building or bridge; a location such as a harbor, airport, protected position, or a travel route.

BACKGROUND OF THE INVENTION

Under certain scenarios this search space may be referred to as a threat space. Typically at least one of the site, object, or medium, such as atmosphere or water, is non-stationary. In particular, versions of the invention described herein will enhance the detection and tracking of surface-hugging moving objects (SHMOs) within an obscuring (capable of at least one of scattering, absorbing, and distorting) or non-obscuring medium. The detection and tracking of non-surface-hugging objects will also be enhanced by implementing versions of this invention. Examples of surface interfaces include the atmosphere-water interface, atmosphere-terrain interface, atmosphere-vegetation interface, atmosphere-building interface, water-ice interface, and water-ocean bottom interface. Two groups of objects that are of particular concern are:

Flying objects such as helicopters, manned and unmanned planes, and missiles, which can include by way of example sea surface skimming, cruise, scud, intermediate, long range, surface-to-air, air-to-air. In particular surface-hugging (low-flying) flying objects (SHFOs) such as missiles and planes moving through a non-obscuring or an obscuring medium while in close proximity to a surface. The surface can include environments such as the surface of the water, terrain, tree tops, buildings, lake, river, ocean bottoms, submerged terrain, biological materials, man-made structures, etc. Examples of an obscuring or non-obscuring medium include the atmosphere, which could alter electromagnetic (EM) signal propagation through scattering, absorption, and distortion. Distortions include refractive turbulence effects due to a non-uniform index of refraction distribution.

Example swimming objects and in particular surface-hugging swimming objects (SHSOs) include fish and marine mammals, frogmen, mines, submarines, remote vehicles, and torpedoes moving underwater in close proximity to a surface. Since water is a type of acoustically obscuring medium, detection of SHSOs can be difficult.

Additional types of objects that can also be detected and tracked using versions of this invention include boats, surface vehicles (bikes, cars, trucks, etc.), and animals (birds, people, etc.).

The present invention can be understood by considering the problem of trying to detect and track a stationary or moving object within a search or threat space. This operation is made more difficult when the object is within an obscuring medium and/or the object is a moving object. An added complication arises when the object is near a boundary or interface between two mediums. A challenging problem involves detecting and tracking surface-hugging moving object (SHMO) within an obscuring medium (a medium such as water or air which is capable of scattering, absorbing, and/or distorting the propagation of acoustic or electromagnetic (EM) radiation, respectively). SHMOs of interest are surface-hugging swimming object (SHSOs) and flying objects (SHFOs). Examples of SHSO include submarines, autonomous underwater vehicles, frogmen, and marine mammals or fish moving through the water (an obscuring medium) while in close proximity to the water-atmosphere or water-ocean/lake/river bottom boundary (including submerged terrain, biological structures, and man-made structures). Examples of SHFOs include missiles or small planes moving through the atmosphere (an obscuring medium) while in close proximity to a surface.

Consider the problem of detecting and tracking SHFOs. Active detection and tracking methods (such as radar) and passive detection and tracking methods, such as detecting infrared emissions or scattered EM radiation due to natural illumination, have been employed with limited success. Missiles and planes are often coated with radar-absorbing materials and/or have shapes which present a low radar cross section. The EM signature of a missile flying close to a surface such as water often contains clutter and speckle or scintillations (when coherent interference conditions are present) due to multipath and atmospheric refractive turbulence effects or distortion. These effects are also present in the passive case since atmospheric refractive turbulence near the surface can distort the propagation path of EM radiation, for example, uv, visible (optical), infrared, and microwave, due to a non-uniform index of refractive and atmospheric scattering and absorption are also present. The cumulative effects from EM scattering, absorption, or distortion (or any combination thereof) can cause the atmosphere to assume the role of an obscuring medium for the purpose of remote detection of a SHFO. A time-varying surface (boundary or interface), as in the case of a body of water, adds another layer of complexity to the multipath aspect of the detection and tracking (or image reconstruction) problem. In the field of optical and infrared astronomy, the local atmosphere distorts the propagating wave front from stars in addition to scattering and absorbing the wave front. Related imaging problems involving the effect of scatter, absorption, distortion, and sometimes multipath interaction with the propagating wave front are encountered in medical and industrial Ultrasound and Ultrasound CT. See Modern Acoustical Imaging (H. Lee & G. Wade, eds. 1986; A. Kak, et al., Principles of Computerized Tomographic Imaging (1988)).

A particular example involves detecting and then tracking a sea surface skimming missile targeting a ship at sea. A sea surface skimming missile is likely to move within a fairly specific search space (threat space) as it approaches a ship. This problem has led to the development of radar systems (radar interferometers) with high angular resolution for the purpose of tracking a sea surface skimming missile. The high angular resolution capability is only of practical value because the viable search space is relatively small. Consequentially, approximate positional and directional information is already available. Unfortunately atmospheric effects and multipath interactions impede detection and tracking with this type of radar. If a passive detection method such as infrared detection and tracking is employed, the earliest opportunity to initiate a defensive strategy is when the missile clears the horizon. Unfortunately, the passive signal from the missile may pass through a substantial distance of a scattering, absorbing, and distorting atmosphere before it is detected. It would be desirable to compensate, either electronically or mechanically, for the contribution to the atmospheric image transfer function (ITF) that is due to refractive turbulence and so improve detectivity. It would also be desirable to compensate for the scattering and absorption aspects of the ITF. For purposes of tracking a SHFO, the atmospheric ITF can be updated as a function of position in the vicinity of the SHFO. The ITF need not be limited to incorporating only atmospheric effects. It can be extended to include multipath propagation due to any nearby surfaces. Active detection and tracking capabilities can be improved by encoding the search space and by increasing the distribution of data samples with respect to viewing angle. Multiple viewing angle imaging techniques such as tomosynthesis, described in computed tomography (CT), Positron Emission Tomography (PET), and Singe Photon Emission Computed Tomography (SPECT) (see E. Christensen, et al., An Introduction to the Physics of Diagnostic Radiology, (1978); J. Liu, et al., IEEE Trans Medical Imaging, Vol. 8, No. 2, pp. 168-172 (1989)) are widely used in medical and industrial radiology.

SUMMARY

An apparatus provides spatial encoding of a search space by use of a radiation source providing a plurality of beams. At least one radiation source is used and is capable of providing a predetermined type of radiation in the form of a plurality of beams arrayed along at least one directional axis, with the beams arranged in successive alignment to exhibit a directional component characterized by a frequency variance between successive beams in accordance with direction and disposed so radiation therefrom propagates within the search space. One or more radiation detectors detect radiation of a type associated with the radiation source and are disposed to detect at least the predetermined type of radiation. In one particular configuration, at least one radiation source is mobile.

In one particular configuration, the radiation source provides at least one of EM radiation, ionizing radiation, and acoustic radiation. The radiation source provides an encoded waveform comprising one of wavelength, time of flight (TOF), waveform, polarization or phase.

In particular configurations, the encoded waveforms are provided as a spatial grid formed by said plurality of beams arrayed along the directional axis. The encoded waveform may be provided as a spatial grid as a remote source spatial grid or as a local source spatial grid.

In a particular configuration, at least one radiation detector measures background noise signals. The background noise signals may be generated by a natural feature such as by natural features including animals such as snapping shrimp.

DETAILED DESCRIPTION OF THE EMBODIMENTS

Acronyms

1-D—One Dimensional
2-D—Two Dimensional
3-D—Three Dimensional
AFV—Autonomous Flying Vehicle
AM—Amplitude Modulated
ASV—Autonomous Swimming Vehicle
CT—Computed Tomography
CW—Continuous Wave
DIAL—Differential Absorption LIDAR
EM—Electromagnetic Radiation
FM—Frequency Modulated
GPS—Global Positioning System
ITF—Image Transfer Function
LED—Light Emitting Diode
LIDAR—Light Detection and Ranging
PET—Positron Emission Tomography
SERS—Spatially Encoded Radiation Signal
SHFO—Surface-Hugging Flying Object
SHMO—Surface-Hugging Moving Object
SHSO—Surface-Hugging Swimming Object
SPECT—Singe Photon Emission Computed Tomography
TOF—Time of Flight
UV—Ultra Violet The present invention provides a method and apparatus for the detection and tracking of stationary and moving objects, in particular surface-hugging moving objects (SHMOs), within a search space. The search space may be a non-obscuring or an obscuring medium such as the water or the atmosphere. Particular groups of objects of interest include swimming objects and flying objects. Surface-hugging (low-flying) flying objects (SHFOs) such as missiles, helicopters, and planes moving through an obscuring medium such as the atmosphere with a boundary that affect signal propagation by introducing scattering, absorbing, distortion, and multipath effects are difficult to locate and track. Possible boundaries include the water-atmosphere interface, terrain, tree tops, buildings, and the water bottom. Passive and active detection schemes are described. Reference objects, including guide stars, can be used to predict the effects of the obscuring medium on signal propagation. One or more remote source beam patterns can be used to spatially encode a search space with a grid pattern, which may be a remote source spatial grid. The detection and tracking techniques developed for use with SHFOs can be applied to similar problems encountered underwater when attempting to detect and track swimming objects and in particular surface-hugging swimming object (SHSOs). The search space can be increased by distributing sources within the search space, creating a local source spatial grid.

An active detection and tracking system can be combined with passive detection and tracking means for initial detection and tracking of a SHFO. Alternatively, the detection and tracking system can be strictly active if desired. Image transfer function (ITF) compensation or mitigation techniques can be employed with both active and passive systems. Active detection can involve more than just signal interactions with the SHFO. Other indicators (signatures) that can be used to detect the SHFO include the SHFO exhaust, including identifying possible chemical signatures using Light Detecting and Ranging (LIDAR), Differential Absorption LIDAR (DIAL), fluorescence, etc., the turbulence resulting from the motion of the SHFO through the atmosphere, or variations in background signals (often treated as noise).

Objects of interest can be stationary or moving objects. The search space medium can be an obscuring or non-obscuring medium. Boundaries can be present. The search space is associated with a fixed or moving site. Typical sites include platforms (such as a vessel or a plane), structures (such as a building, dam, or bridge), and locations (such as a harbor, air field, protected position, a transit route). A search space may be referred to as a threat space under certain circumstances. A difficult problem is detecting and tracking SHMOs in an obscuring atmosphere or water medium. Flying objects and in particular SHFOs of interest include low-flying missiles or planes that are moving in close proximity to a surface such as terrain, tree tops, water, etc. These environments are of concern because of potential problems due to multipath signals as well as absorption, scattering, and distortion of propagating electromagnetic (EM) signals due to the local atmosphere. In addition, a SHFO such as a missile or small plane typically presents a small radar cross section which varies with the angle of observation. In the case of a SHFO such as a missile that is seeking a target, it is assumed that a target wants to detect the presence of the missile at the greatest possible distance and then track the flight of the missile so that appropriate countermeasures can be implemented.

A SHFO such as a missile which is flying near a surface through an obscuring medium such as the atmosphere that can modify the propagation of electromagnetic signals through at least one of scattering, absorption, distortion effects, refractive distortion effects and turbulence distortion effects. The likelihood of successfully detecting and tracking can be improved by incorporating into the detection system techniques already in use in fields such as astronomy. A beacon or guide star can be a source reference object which generates a useful wave front shape such as a plane wave or a spherical wave due to a point-like source. The beacon or guide star concept was developed for optical and infrared astronomy passive imaging, but can be applied to tracking. The concept of a beacon or guide star can be employed to estimate the distortion due to the atmosphere on the propagating signal. By generating one or more guide stars (such as a point source) based on Rayleigh scattering or resonance fluorescence at one or more remote positions within the detector field of view, distortion corrections can be applied for a series of possible missile positions. (See M. Roggemann, B. Welsh, Imaging Through Turbulence, CRC Press, 1996, p. 173-175 and p. 6-10 for implementations and limitations of this approach.) The guide star would be used to preferably monitor at least up to the effective horizon at the wavelengths of interest. The guide star information could be used to calculate a corrective ITF which would be applied to the digital image data to compensate for the propagation path distortions due to refractive turbulence in the atmosphere and possibly scattering, absorption, and multipath effects. An alternative is to incorporate adaptive optics into the detection system and correct for distortions prior to the signal reaching the camera. Adaptive optics are also in use in astronomy in conjunction with the guide star concept whether the guide star is a product of nature or man-made. (See M. Roggemann, B. Welsh, Imaging Through Turbulence, CRC Press, 1996, p. 6-10.) The concept of a guide star or other reference object with known properties, such as a point reflector, can be applied for use with SHFOs that are passive radiators, such as the EM signature of a missile, or SHFOs that are being actively illuminated. Such reference objects can be referred to as the passive and active cases, respectively, or both. A guide star or other reference object can also be used to estimate scatter contributions to the received signal. A guide star can also be used to detect changes in the ITF that might indicate that a potential SHFO is or has recently modified the obscuring medium. Several types of virtual and physical guide stars were disclosed previously. An example of such virtual and physical guide techniques is described in U.S. Pat. No. 6,288,974, to Nelson.

Active illumination may be used in a manner similar to radar in which the angle-dependent scattered (reflected, diffracted) signal from the object is measured, including Doppler effects. If the observable Doppler shift due to the motion of the object is expected to be much greater than other objects in the field of view, then a Doppler signature can be utilized to help identify the presence of a hostile object. A changing Doppler wavelength can provide additional directional information for tracking purposes. Active illumination can also be used to induce fluorescence from the SHFO or its exhaust (i.e., look for chemical signatures). This can also be used to detect the turbulence from the wake of the object; that is, how the motion or presence of the object modify the obscuring medium. The technique may be used to detect the effects of the system comprised of the SHFO and the surface or to detect how returns from the surface are modified as the SHFO passes over it. A multipath implementation of active illumination can be used to increase the effective image cross section of the SHFO since both direct and surface illumination can be used to view the SHFO from more than one perspective.

Figure 1:
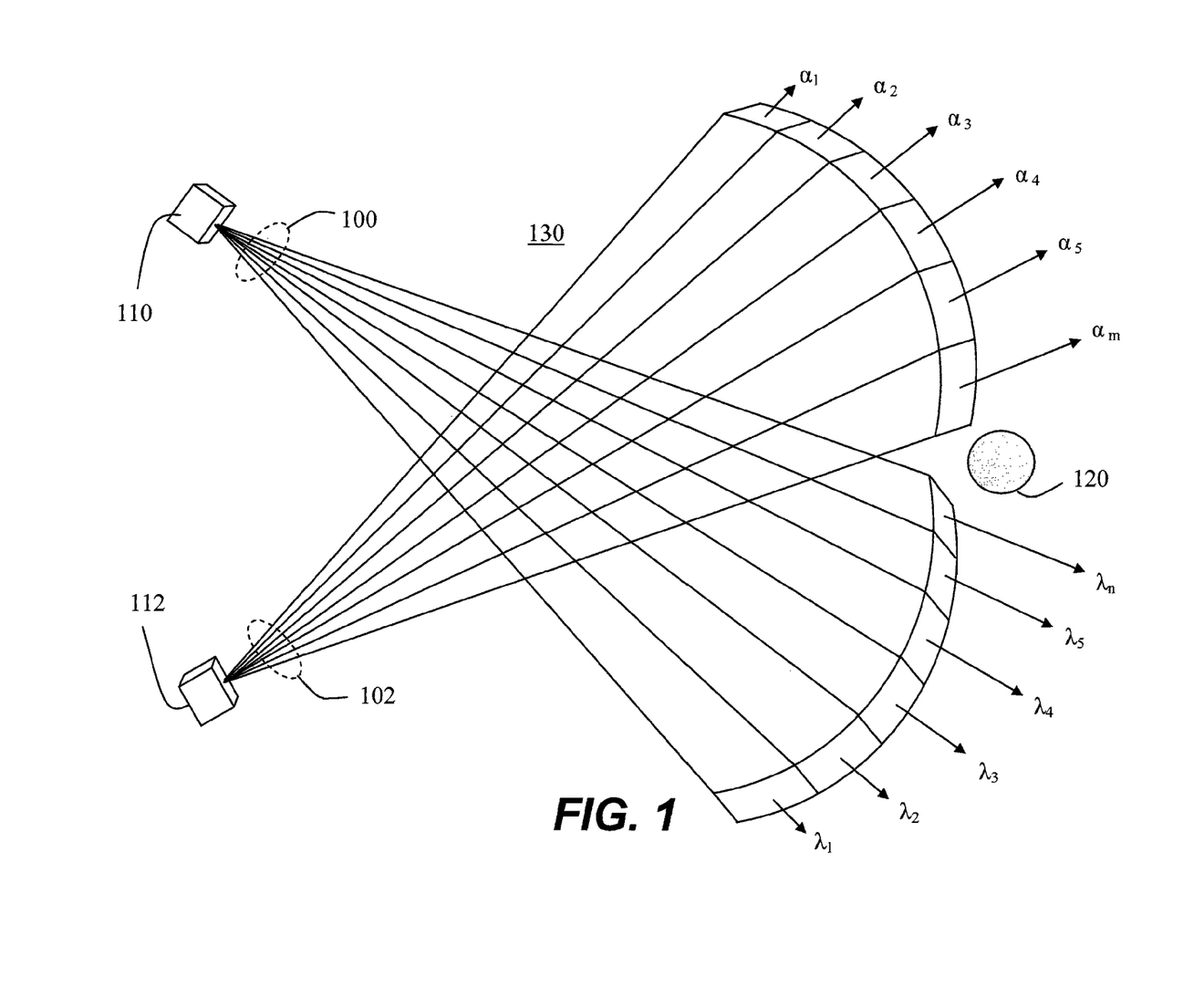
FIG. 1 is a diagram showing multifrequency waveforms emitted from two sources, in which active illumination is implemented using encoded waveforms.

FIG. 1 is a diagram showing encoded waveforms 100 and 102 emitted from sources 110 and 112 respectively for actively illuminating an object of interest 120 in a search space 130. Although only two sources (i.e. 110 and 112) are shown in FIG. 1, it is to be understood that there may be any number greater than one of sources and corresponding encoded waveforms. Encoded waveform 100 comprises n encoded sub-beams $\lambda_1$-$\lambda$, where n is an integer greater than 1. Encoded waveform 102 comprises m encoded sub-beams $\alpha_1$-$\alpha_m$, where m is an integer greater than 1. The encoded waveforms 100 and 102 form a spatial grid pattern much like a "picket fence." The coherent encoded waveforms 100 and 102 are crossed in the search space 130 creating a spatial grid based on the coherent interference effect. When a sub-beam from one of the encoded waveforms 100 or 102 in intercepted by a moving object of interest 120, or its exhaust, the coherent interference effect is disrupted, indicating the presence of an object of interest 120 as well as providing some positional information regarding the object of interest 120. If the object of interest 120 intersects the common volume of the crossing sub-beams then positional and vectoral information may be gathered based on both bistatic illumination (independent of coherence between beams) and any coherent scattering or interference effects between the sub-beams. Pairs of coherent (or incoherent) crossed beams can be used for detecting and tracking objects of interest 120 in a search space 130 even if the search space 130 is obscured by fog or other obscuring media. Bistatic (multistatic) detection and tracking may employ more than two crossed beams (which need not be coherent, can be of different wavelengths, polarizations, and waveforms). Illumination of an object of interest 120 with encoded waveforms 100 and 102 can offer resistance to noise, improve spatial position information, and provide additional details about the object of interest 120. One example of range-encoded illumination is time of flight (TOF) imaging using various coherence effects. Unfortunately in many situations detailed two dimensional (2-D) or three dimensional (3-D) information about the search space 130 is needed. One possible solution is to generate an EM radiation signal that has a one dimensional (1-D) or 2-D (or 3-D) grid spatial pattern such as a mesh or "picket fence" wherein individual grid element parameters such as frequency, polarization, or even waveform are allowed to vary. The spatial grid pattern can be implemented using a variety of waveforms ranging from continuous wave (CW) to TOF (or related temporal coherence techniques). Complex 2-D and 3-D grid patterns can be generated from a single source (or the equivalent combined output from multiple sources) or formed by crossing the grid patterns from multiple distinct sources as shown in FIG. 1. The search space 130 can be interrogated from multiple angles if crossed grid patterns are utilized. Illuminating grids (as well as other encoded waveforms) can be used in multipath arrangements. This grid format is referred to as a remote source spatial grid since the grid is projected into the search space 130. Sources 110 and 112 can be mounted on a tiltable and rotatable platform. An advanced version of this approach encodes the individual slats of the picket fence (e.g., beams $\lambda_1$-$\lambda_n$, and $\alpha_1$-$\alpha_m$) by encoding each beam as a function of vertical position within the slat.

Figure 2:
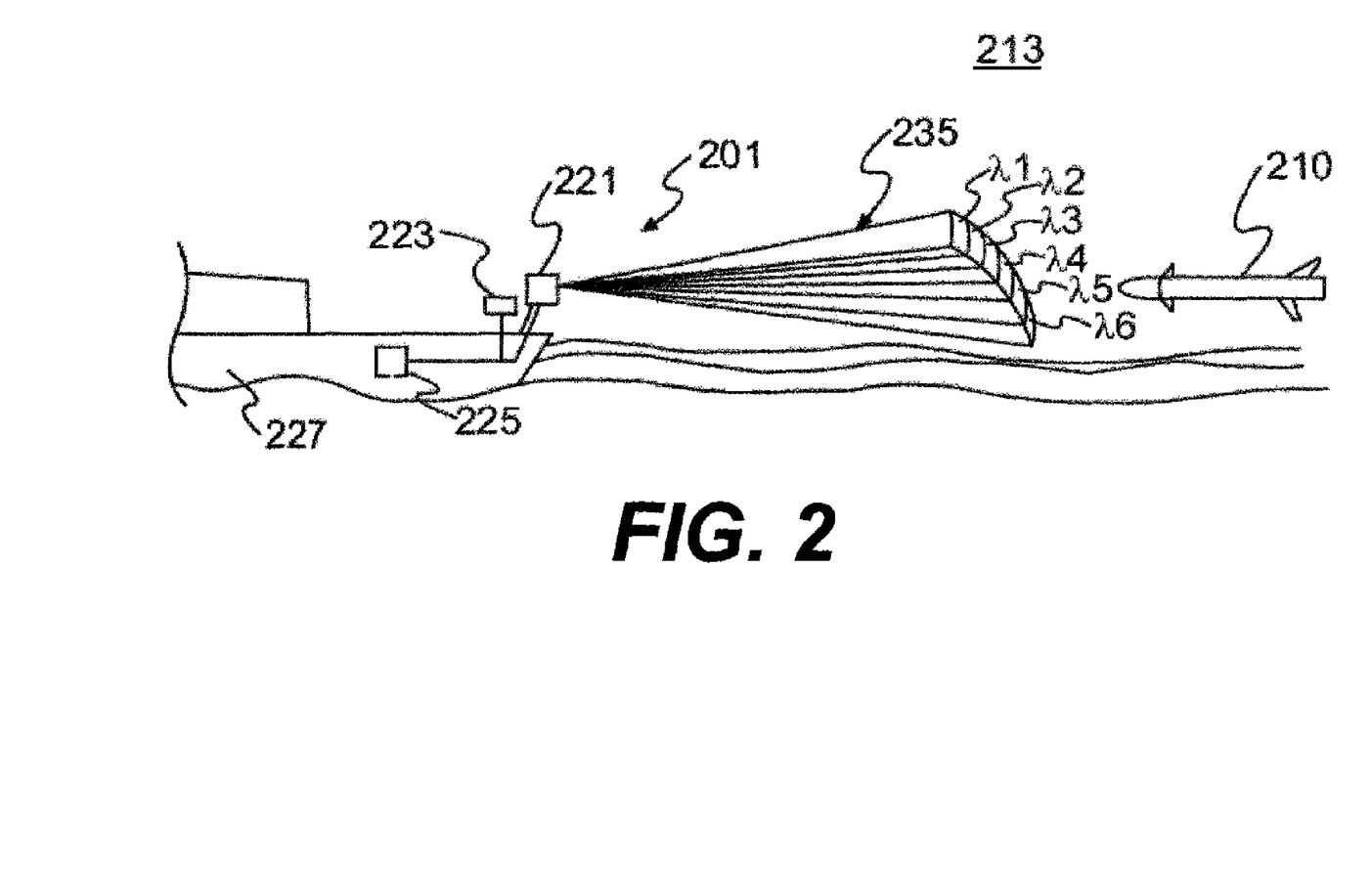
FIG. 2 is a diagram showing a remote EM source spatial grid pattern in which the grid elements form a picket fence with "N" wavelength-encoded slats (frequencies 1-N). The rotatable, tiltable source is located on a ship. The search space is bounded by the air-water interface and is assumed to have a limited vertical extent.

FIG. 2 depicts a system 201 for detecting an object of interest 210 in a search space 213 comprising at least one spatially encoded radiation signal generator 221, at least one radiation signal collector 223, and a processor 225, depicted as located on a ship 227. The radiation signal generator 221 may generate a spatially encoded radiation signal (SERS) 235, which may propagate into search space 213. The SERS 235 forms a spatial grid pattern in which the grid elements form a picket fence with "N" encoded slats depicted as $\lambda 1$-$\lambda 6$. Although only 6 "slats" of the SERS 235 are shown in FIG. 2, it is to be understood that the SERS 235 may have any number of slats 1-N. The SERS 235 may be encoded by frequency, waveform, and polarization; to name a few examples. Search space 213 may be water, or atmosphere. Once the SERS 235 encounters the object of interest 210, a reflected radiation signal (not separately shown) may reflect off of the object of interest 210 and propagate in the direction of the radiation signal collector 223. If the reflected radiation signal is detected by the radiation signal collector 223, the radiation signal collector 223 may transform the reflected radiation signal 223 into a data signal. The data signal may then be transmitted to the processor 225 where the first data signal may be transformed into positional and vectoral data of said object of interest 210. The vectoral and positional data of the object of interest 210 may be based on an encoded characteristic of the reflected radiation signal. The vectoral and positional data may then be sent to another processor, stored on a memory device, or displayed to a user.

FIG. 2 shows the cross-section of the beams as being rectangular, but it is to be understood that the cross-sections in FIG. 2 and the other figures may be any shape in which an electromagnetic wave may propagate, including polygons, ellipses, and circles, to name a few.

Figure 3:
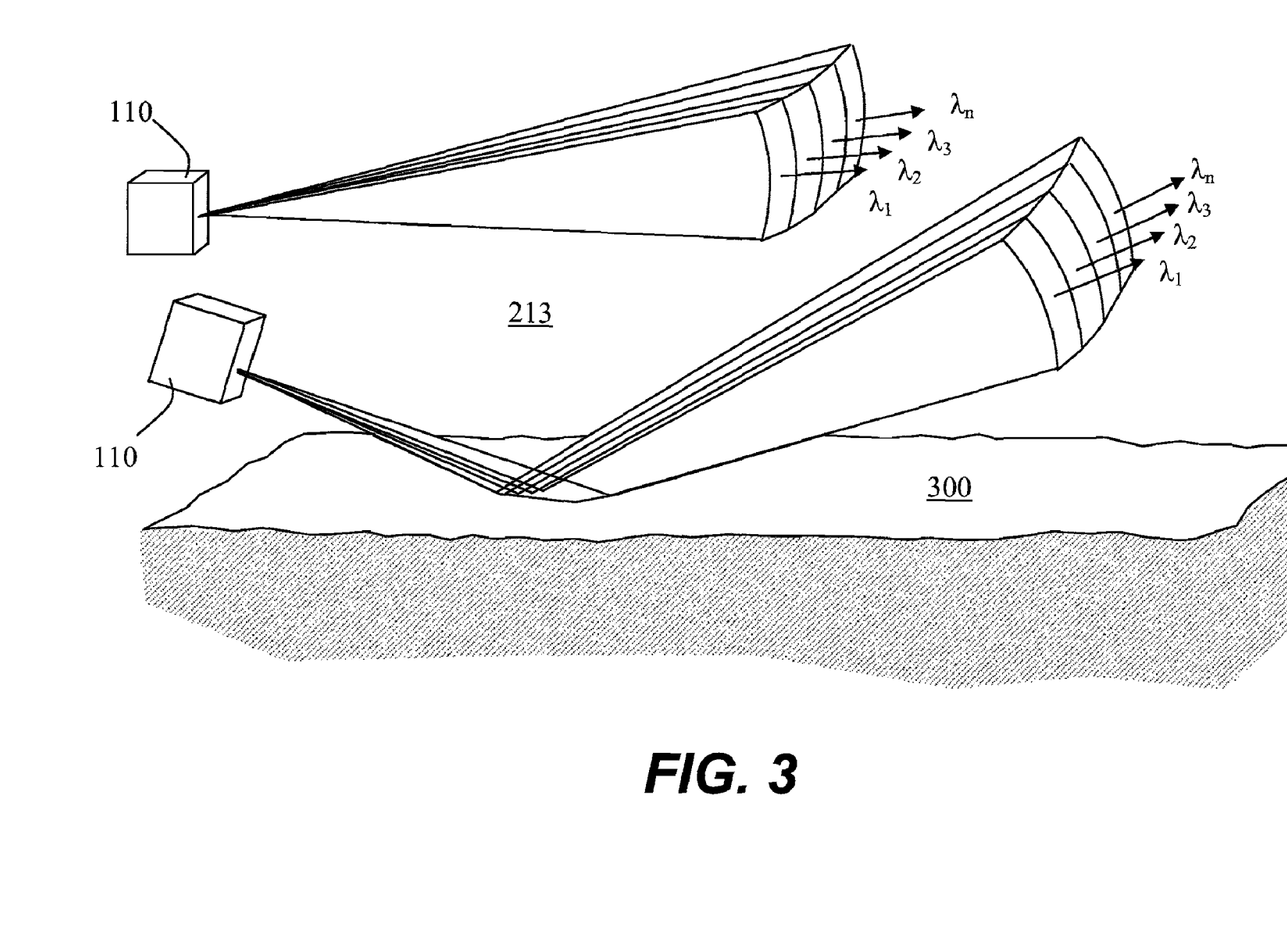
FIG. 3 is a diagram showing remote EM source crossed picket fence grids where one array is reflected off of a surface.

FIG. 3 shows how the SERS 235 can be formed using an array of beams $\lambda_1$-$\lambda_n$ directed toward the horizon and another array of beams $\lambda_1$-$\lambda_n$ directed to the horizon but reflected off a sufficiently smooth, partially reflective surface 300. This can be alternatively formed by simulating an array of beams using rapid scanning techniques. If the source provides short pulses, which are another form of encoding, then TOF information can be used to further refine the positional information. The sources 110 may be mounted on tiltable, rotatable platforms on a ship (not shown) to vary the point of intersection of the two arrays of beams.

Figure 4:
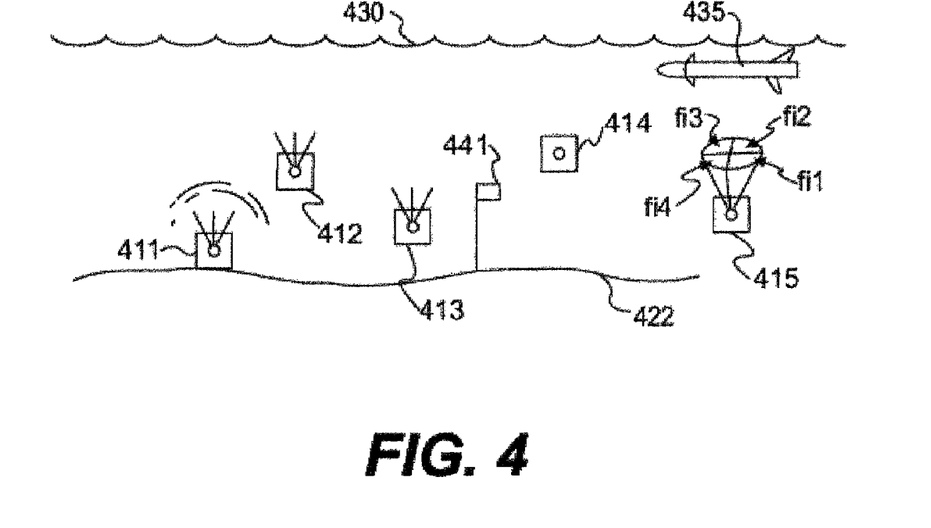
FIG. 4 is a diagram showing a local source spatial grid pattern due to a dispersed set of frequency encoded sources positioned on or near the water bottom.

FIG. 4 is a diagram showing a local source spatial grid pattern due to a dispersed set of frequency encoded transducers 411-415 positioned on or near the water bottom 422, which is an approach that is widely used in medical imaging. Referring to FIG. 4, even if the medium is not obscuring and multipath issues are not important, the problem of a detecting or detecting and tracking an object with an angle-dependent cross section remains. Source 415 is shown with a four quadrant spatial structure, indicated at "fi1", "fi2", "fi3" and "fi4". Underwater remote source EM and acoustic versions of the atmosphere EM spatial encoding grid techniques can be implemented although the practical search space range is typically reduced relative to the atmospheric case. Detection and tracking in coastal regions can be problematic due to turbulence, the bottom terrain and ocean surface, vegetation, animals, and biological matter. The practical underwater search space range can be extended by distributing encoded sources at known locations within the search space on or near the water bottom and thereby creating a local source spatial grid. The local source spatial grid may operate in conjunction with the remote source spatial grid or as a stand-alone system. The encoding schemes described for remote source spatial grids can be used with local source spatial grids. For example, each local source could be encoded using a unique frequency (wavelength/color). FIG. 4 also shows a reference object 455, discussed below.

An additional modification is to spatially encode each local source with two or more unique frequencies as depicted in connection with source 415. These local sources can be programmed to react to a trigger event or they can be triggered remotely (or the triggering can be automated). An object within the search space will modify the encoded source signals that reach the detectors depending on its shape, size, material properties, and location. Thus object spatial information (along with Doppler information) is available due to the disruption of the signals reaching the detectors due to the presence of swimming objects. (The same principle applies to flying objects in the atmosphere.) Detectors can be included with some or all local sources and/or located inside and outside the active field. Detectors can then communicate data to designated receivers or function as situation-dependent alarm bells. Reference data can be acquired in order to correct for severe distortions of propagating signals. If phase information is recorded, for example from EM sources, then diffuse wave analysis techniques can be applied. Another localization technique is to weight the signals received by various detectors due to each source in a manner similar to the spatial weighting techniques used with conventional Nuclear Medicine Gamma cameras (a large scintillation crystal with spatially dispersed photomultiplier tubes as detectors) or underground neutrino detectors used in particle physics. Sources can be activated individually or they can be programmed to emit in a staggered manner. A single frequency for all sources may be permitted if each source is delayed by an adequate amount or each uses a sufficiently distinct waveform.) The same concepts of signal processing and displaying detection and tracking information that were used for atmospheric problems are applicable for underwater problems.

Referring to FIG. 4, if the array of beams transmitted by transducers 411-415 is reflected off the surface 430, then the encoded EM fence can be scanned over a volume by changing the reflection points on water surface 430. The position of a swimming object or a SHSO 435 can be identified using simple collecting optics and a low-resolution detector which may be a discrete detector 441 or integral with transducers 411-415. Spectral filters (part of the detector) can be used to identify the slats contributing to the scattered radiation as well as possible Doppler shifts. Thus, encoding the active illumination radiation field can provide positional information as a result of the grid pattern and vectoral information as a result of measured Doppler shifts. Reflecting an array of beams, or even a simple line beam, off of the surface, with or without encoding, could increase the surface area of the SHSO or other swimming object that interacts with the beams and thus could increase the signal levels measured by the detector(s). Another active "barrier" technique is to illuminate a distant surface area and monitor the scattered radiation. Noticeable changes in the monitored radiation distribution could indicate the presence of a SHFO 435 that would block or re-scatter the scattered radiation. Active illumination in the ultraviolet (uv), optical, infrared, and microwave can be a useful adjunct to or replacement for radar for the types of applications that have been described.

Medical imaging techniques such as CT in its various forms (x-ray, acoustic, microwave, optical) and tomosynthesis represent instances of active multiple view imaging through an obscuring medium. Positron Emission Tomography (PET) is an instance of the passive multiple view imaging for which restricted field of view, providing a collimating aperture, energy discrimination, and coincidence discrimination, providing a time-resolved or coherence technique based on TOF, are all utilized to help localize a source that is observed through an obscuring medium (the human body). A number of optical techniques which exploit directionality, polarization, spectral, statistical, and coherence properties have also been used in medical imaging. Examples of such imaging techniques are described in U.S. Pat. Nos. 4,649,275 (3-10-87), 4,767,928 (8-30-88), 4,829,184 (5-9-89), and U.S. Pat. No. 4,948,974 (8-14-90), each to Nelson, et al. Optical coherence imaging techniques (TOF, holography, heterodyning, homodyning, spectrometry, Raman amplification, etc.) and optical diffusive wave imaging techniques have been used in several medical imaging applications wherein the medium is highly scattering, absorbing, and index of refraction discontinuities are present (see Medical Optical Tomography, SPIE Vol. IS11, G. Muller, et al., ed., (1993)).

Imaging techniques that employ ionizing radiation including soft x-rays, hard x-rays, gamma rays, and particle radiation such as neutrons (neutrons which interact through nuclear processes are included in this definition), can also be employed for detecting and tracking SHFOs. For example, a collimated or wide area source of ionizing or activating radiation. Such radiation might use focusing capillary optics or microchannel plate optics, crystals, multilayer mirrors, refractive lenses, etc., and could be used to create fluorescence (characteristic) radiation that could be detected, along with scatter radiation. A uv, optical, infrared, or microwave beam can be used with an ionizing radiation imaging system to provide additional sampling information and/or as a safety feature to demarcate the position of the hazardous radiation beam(s). Grid spatial patterns can be implemented by filtering a broad spectrum source or by using multiple sources with distinct wavelengths. If any fluorescence radiation is in the uv, optical, infrared, or microwave wavelength range, then scattering and absorbing properties of the obscuring medium (the atmosphere) need to be considered since these effects will modify the return signal. One advantage to detecting characteristic or scattered ionizing radiation such as x-rays or gamma rays or even neutrons is that the source of such scattered or characteristic radiation highly likely to be man-made. Detectors need not be highly focused unless positional information is desired. A further advantage is that the x-ray, gamma ray, or neutron source radiation tends to travel through the atmosphere in a straight line with little scattering. This makes it difficult for an opponent to locate the source of the beam unless the opponent is close to the direct beam path.

A scenario in which a surface is not involved is a flying object that is hidden by fog or clouds, which are scattering and absorbing mediums. The various optical techniques cited previously are still applicable. For example, a diffusive wave imaging technique can be exploited to look for phase changes that result from a flying object or its turbulence locally modifying the scattering and absorption properties of the medium. Doppler-shifted radiation can be measured. A direct extension of this idea that does involve a surface is a SHFO, small ship, or land craft moving through fog or a smoke screen. Sampling from a number of locations using encoded waveforms, diffusive waves, crossed beams, Doppler effects, etc. can help localize the object in addition to improving confidence levels concerning the presence of a SHFO, a flying object or a non-flying object such as a small ship or land craft. Many of the imaging techniques described for detecting and tracking flying objects and SHFOs in the atmosphere using EM radiation can be applied to similar problems involving the use of acoustic radiation to image swimming objects and surface-hugging swimming objects (SHSO) moving underwater. High resolution imaging is problematic in this obscuring medium since, in many environments (coastal regions, harbors, rivers, lakes, etc.) the water scatters, absorbs, and provides a non-uniform index of refraction. The presence of nearby surfaces (ocean, lake, and river bottom, underwater terrain, ice, ice bergs, an atmosphere-water interface, man-made structures, biological materials) can introduce additional multipath problems. Detecting and tracking intruders such as frogmen, torpedoes, submarines, mines, and remote vehicles is highly challenging. The problem is accentuated by the fact that many of these swimming objects (or SHSOs) have angle-dependent EM and acoustic cross sections. Underwater EM and acoustic versions of the atmosphere EM spatial encoding grid techniques can be implemented although the practical search space range is typically reduced relative to the atmospheric case. The practical underwater search space range can be extended by distributing encoded sources at known locations on or near the water bottom. These sources can be programmed to react to a trigger event or they can be triggered remotely, or operations can be automated. An object within the search space will modify the encoded source signals that reach the detectors depending on its shape, size, material properties, and location. Detectors can be incorporated into some or all sources and/or located inside and outside the active field. Detectors can then communicate data to designated receivers or function in situation-dependent alarm bells. This grid format is referred to as a local source spatial grid since the locations of the sources create the grid pattern. It exploits tomography techniques using relatively simple sources and detectors.

Standard signal processing and tracking techniques can be implemented once detector data has been delivered to a computer for analysis. The processed data can be displayed. The output may be used to adaptively modify the grid patterns, source waveforms, the detectors, the illumination angles, etc. Examples of such signal processing techniques are described in U.S. Pat. No. 6,288,974 (9-11-01) to Nelson.

Referring back to FIG. 1, an active detection and tracking system for flying objects that uses crossed encoded waveforms and appropriate collimation could be highly effective in resisting noise while providing improved spatial and directional information, assuming Doppler information is available. CW, modulated CW, coherent (such as TOF), spatial, spectral, polarization, etc. encoded source waveforms can be utilized. A simple implementation is to illuminate a region with a narrow bandwidth remote source and try to detect the Doppler-shifted scatter signal. Spatial localization capability can be improved by using more than one distinct receiver and/or using TOF techniques (range information). Another approach for providing spatial information (with or without a TOF source or multiple receivers) is to use a remote source to generate an EM spatial pattern, such as a grid (a remote source spatial grid), wherein individual pattern elements may be spatially encoded by waveform, wavelength, polarization, temporal dependence, and spatial separation. The illuminating grid as well as other encoded waveforms can be used in a multipath arrangement since there will be a surface (an interface) present for the case of a SHFO. For example, consider forming a wavelength-encoded, one-dimensional grid such as a "picket fence" wherein at least each adjacent slat (grid element) is a different wavelength. This concept can be extended so that the vertical structure of a slat is wavelength encoded. The remote EM source can be adjusted with respect to position and elevation as well as rotation and tilt. This fence-like grid can be projected directly into the search space or it can be reflected (scattered) off of the surface region that the SHFO is expected to fly over (providing an additional viewing angle). Assume that the surface is an air-water interface that is at least partially reflecting (with beam losses due to absorption, transmission, and scattering). This grid or picket fence can be composed from an array of beams (or by simulating an array of beams by rapidly scanning the source) directed toward the search space or directed to the search space but reflected off the surface. A simple modification is to split the wavelength-encoded grid into two grids such that the grids propagate in parallel but one beam is reflected from water surface. (Another version is to use two different wavelength encoded grids in the same geometry.) One may implement a source that creates a 2-D (or 3-D) grid or fence, providing additional spatial information. The use of a pattern such as a grid could result in reduced receiver costs since resolution information is embedded in the pattern. A number of methods including multiple EM sources, filters, grids, beam splitters, fiber splitters, diffractive optics, etc. can be used to generate one or more wavelength-encoded spatial patterns (other types of encoding, such as by polarization or waveform are also possible). Moving patterns, such as reciprocating patterns, can also be created. If short pulses or coherent waveforms are used, TOF information can be used to further refine the position information and help minimize signals due to unwanted scatter from the surface. If the grid is reflected off the surface then the encoded EM picket fence can be scanned over a volume by changing the reflection points on the surface (tilting the source). The position of a SHFO intersecting the EM fence can then be determined using a low-resolution detector combined with simple collecting optics and a prism or color filter to identify the scattered radiation. If Doppler-shifted radiation is examined then additional vectoral information is available and the shift in wavelength may help discriminate against scattered radiation that contributes to the background noise. Reflecting an array of beams (or even a simple line beam) with or without encoding could increase the surface area of the SHFO that interacts with the beams and thus could increase the signal levels measured by the detector(s). This also presents an opportunity for the object to move through two spatially-separated grids and thus providing additional information about the flight path.

Another example of a coherent detection technique involves detecting scattered radiation from the interaction of a pair of coherent crossed beams with the search space. (Indeed, one of the beams could function as a "pump" beam. In the limit, the "pump" beam could be completely crossed (collinear) with the second beam. See W. Demtroder, Laser Spectroscopy (p. 505-514), Springer Verlag, 1996 for the possible generation of new, directional radiation that could be detected.) When one beam is intercepted by a SHFO (which can include its exhaust), the coherent interference effect is disrupted, providing at least some positional information in addition to establishing the presence of an SHFO. If the SHFO intersects the common volume of the crossing beams then the detection and tracking system can benefit from both bistatic illumination (independent of coherence between beams) and any coherent scattering or interference effects between the beams. Thus, pairs of coherent (or incoherent) crossed beams can be used for detecting and tracking SHFOs in an obscuring medium (or a non-obscuring medium). The bistatic (multistatic) detection and tracking concept is readily extended to employ more than two crossed beams (which need not be coherent, can be of different wavelengths, polarizations, and even waveforms). This use of crossed beams is another example of spatial encoding using a simple spatial pattern. Coherent (or incoherent) crossed beams could be used to encode more complicated spatial patterns such as a grid pattern.

The concept of crossing beams can be extended to include crossing grid patterns. For example, two rotatable and tiltable sources of wavelength-encoded (frequency- or wavelength-encoded) grids could be placed on a platform such as a ship near the bow and stern, as depicted in FIG. 3. The patterns would cross in the spatial region defined as the threat space (in which a sea surface skimming missile is likely to travel through). Inexpensive detectors with appropriate filters, gratings, or prisms would receive a backscattered signal primarily composed of two wavelengths that characterize a spatial location in the threat space. Additional information can be obtained by measuring Doppler shifts in the backscatter radiation. If the crossed grids incorporate a detailed structure then tracking may be accomplished by observing the SHFO (such as a sea surface skimming missile) as it passes through a number of crossed beam wavelength combinations. Wavelength (spectral) coding is but one method of beam or grid encoding. Other properties that can be manipulated include, but are not limited to, polarization, TOF or coherence, and waveform modulation. Advantages include relatively inexpensive EM sources (arc lamps, LEDs, lasers, microwave, etc.), straightforward means of creating spatial patterns such as focused beams, simple collection optics, and mature detector technologies. These configurations can be made compact so that versions could be placed on a ship or other platforms (such as planes). More than two grid source can be employed, permitting more-detailed crossed patterns as well as additional illumination angles or views. The location of the grid sources need not be limited to the platform that is to be protected. In the case of a ship, grid sources could be mounted on autonomous flying vehicles (AFVs) that could then position themselves at advantageous locations with respect to the ship. If the AFVs also incorporate detectors then the scattered signals from parts of a sea surface skimming missile can be sampled from a larger number of directions. The AFVs would extend the detection range of the ship. The AFVs can include Global Positioning System (GPS) equipment. Positional data as well as grid source rotation and tilt angle information can be transmitted to the ship. (An alternative to installing GPS equipment in the AFV is to track the AFV from the ship.) The use of one or more remote source EM grids to monitor the search space does not entirely eliminate the possible problems associated with an obscuring medium. Dead zones may be present and the assumption of ray optics may not always be satisfied. Calibration of the search space or some representative part of the search space may be needed. If the calibration (reference object) is an optical guide star, then the laser that creates the guide star may also be used to generate a detection beam or grid.

The probability of successfully detecting and tracking a SHFO with a small radar cross section (such as a sea surface skimming missile or a plane that hugs the terrain, water, tree tops, etc.) can be further improved by employing techniques already in use in fields such as astronomy and applying those techniques for uv, optical, infrared, and microwave imaging (see Nelson, R U.S. Pat. No. 6,288,974[9-11-01]). For example, speckle image processing is already in use as a method to correct for the effects of propagation through the atmosphere. The use of one or more reference objects 455 (FIG. 4) such as guide stars or beacons, or other objects which have been implemented for astronomy (an artificial guide star produced with a laser), can provide an estimate of wave front distortion due to propagation through the non-uniform atmosphere as well as multipath effects. By generating a source with a desirable wave front (such as a point source with a spherical wave front) at one or more remote positions within the detector(s) field of view, distortion corrections can be applied for a series of possible SHFO positions. The guide star would be used to preferably monitor at least the effective horizon at the wavelengths of interest. The guide star information could be used to calculate a corrective ITF that would be used on the digital image data to compensate for (deconvolve), in part, the distortion effects due to the propagation path. An alternative is to incorporate adaptive optics into the detection system and correct for distortions prior to the signal reaching the detector (such as a camera). Adaptive optics are also in use in astronomy in conjunction with the guide star concept (whether the guide star is a product of nature or man-made). Non-physical reference objects such as a guide star or physical reference objects with known properties (for example, a simple point reflector or a complex reference object such as a cylinder, coated cylinder, etc.) can be used with SHFOs that are passive radiators (such as the electromagnetic signature of a missile) or objects which are being actively illuminated (the passive and active cases, respectively) or both. If the reference object is sufficiently similar to the SHFO (or class of such SHFOs) then this reference object image or signature can be correlated with signatures acquired during an actual search. A reference object image or signature represents the effects of reflection/diffraction/absorption and propagation for a system comprised of a source, reference object, and receiver. It should be noted that the propagation effects are not limited to the non-uniform medium (typically the atmosphere). In some cases multipath effects due to a nearby surface will also be prominent. Thus detection and tracking are likely to be affected by the SHFO, neighboring structures, how the motion of the SHFO modifies the medium (for example, by introducing chemicals or through turbulence or heating), and how the motion of the SHFO modifies the neighboring structures (for example, through a pressure wave). All of these factors can be considered when attempting to detect and track a SHFO.

An alternative to taking measurements of a detailed reference object is to synthesize a reference object image or signature from the known properties of a SHFO (or class of SHFOs) and a measured image transfer function from a simple reference object such as a guide star. This synthesized image or signature can then be compared with the received image data. Reference object measurements can be made for one or more possible orientations of the reference object. Measurements for one or more reference objects can be made from multiple viewing angles. Thus, monostatic and bistatic (multistatic) propagation paths can be utilized. Another corrective technique involves the use of an illumination field that is distorted (using adaptive optics) prior to transmission through the medium such that the distortions compensate for the effects of the propagation path. This compensated wave front technique has been implemented in acoustic imaging (for example, time reversal mirrors, a self-adaptive technique). See SPIE vol. 1733 (F. Lizzi, ed., 1992) and M. Fink, Object Detection and Imaging with Acoustic Time Reversal Mirrors. SPIE vol. 1942, p. 256-26'7, 1993. Yet another method is to use a guide beam or a self-focusing beam for imaging so that the effects of distortion are reduced.

If no natural or man-made reference object (for example, a self-powered EM source radiating a spherical, elliptic, plane, etc. wave front mounted to a buoy, model airplane, etc.) is available, then a collimated light source such as a laser of appropriate wavelength (guide stars at several wavelengths can be implemented if needed) can be used to create a guide star or a number of guide stars at desired locations. If the laser is pulsed the option of using a coherent technique such as TOF is available for locating the position of the guide star (range finding) or a series of guide stars (the time evolution of the pulse can be observed as an alternative to sending out a sequence of pulses). Ideally the guide star technique can be utilized out to the effective horizon. If a physical reference object is available then in a minimal configuration it functions as a point-like reference object. A complex physical reference object would be capable of interacting with the illumination beam in a manner similar to that of the SHFO. The reference object (for example, a small drone) could be in motion, introducing effects such as turbulence. (Of course, the reference object 455 could incorporate its own guide star in addition to active illumination.) Several reference object images (or signatures) may be needed if there is a dependency on viewing angle. The physical reference object 455 can incorporate a GPS locator as well as a communication system so that it can transmit its spatial coordinates and relevant source and/or receiver measurement information (including camera images). It is assumed that the reference image data can be acquired and used within a suitable time period that is relevant for the conditions that exist. The information is used to create a data base (a description of a typical SHFO and its modified environment) that can be compared against received signals. The data base can be synthesized from measurements and knowledge of the properties of the expected SHFO. Numerous pattern recognition techniques can be employed to help detect a SHFO. Thus, simple (such as a guide star) or advanced reference object techniques can be used to correct distorted raw data or provide examples of the effects of distortion.

Active illumination offers opportunities for detecting the presence of a moving SHFO in addition to scatter detection or compensating for propagation through the atmosphere and multipath. The received scattered (reflected, diffracted) signal from the SHFO will exhibit angle-dependent Doppler effects. If the observable Doppler shift due to the motion of the SHFO is expected to be much greater than other objects in the field of view, then a Doppler signature can be utilized to help identify the presence of a SHFO and possibly its position (positional information can depend on many factors such as the properties of the illuminating field and the resolution of the receiver or receivers). A changing Doppler wavelength can provide additional directional information for tracking purposes. Active illumination can also be used to induce fluorescence or enable Raman scattering by the SHFO or chemicals in its exhaust, to detect the turbulence from its wake, or to detect modifications to nearby objects or surfaces (that is, how the motion or presence of the object modify its local environment). Thus a pressure wave could alter the surface of water or induce motion in tree tops, etc. Under the right conditions active illumination can be employed to take advantage of multi-path propagation to and/or from a SHFO (the SHFO and nearby objects such as a surface can essentially behave as a coupled system for purposes of illumination). TOF or other coherence techniques can be used to separate multipath contributions to the received signal.

Since many versions of this invention are possible, the requirements for EM sources in the uv, optical, infrared, or microwave region may range from continuous (for example CW or modulated CW (AM, FM)) to rapidly pulsed (for example TOF or coherence) waveforms. Controlling waveform parameters such as the signal pulse width, the collimation (including the angular distribution and the dimensions of the input beam), the spectral composition, the phase, the amplitude, the time-dependence, the coherence, and the degree of polarization of the signal are methods of encoding or restricting the properties of the radiation source. A number of phase, frequency, and noise-resistant encoded waveforms (for example, chirp pulses) have been used in radar (see, e.g., D. Wehner, High Resolution Radar, Chapters 3 and 4, (1987)) and acoustics (ultrasound, underwater, geophysical) (see, e.g., G. Kino, Acoustic Waves: Devices, Imaging, and Analog Signal Processing (1987)), in optical communications, e.g., a "complex" waveform such as a soliton pulse, in electronic communications, and in encryption, and can be applied to detection and tracking of a moving SHFO in an obscuring medium. Such waveforms are also described in C. Nagasawa, et al., Applied Optics, vol. 29, no. 10, p. 1466-1470 (1990). Such waveforms permit decoding of scattered (or transmitted) signals and, thus, allow a comparison of how beam properties such as coherence, amplitude, time-dependence, spatial distribution, phase, spectrum, polarization, and relationships between pulses (for example, pulse patterns or sequences) or wave fronts, etc., are modified by the environment through which the beam passes. The use of adaptive beam forming techniques and filters (see G. Kino, Acoustic Waves: Devices, Imaging, and Analog Signal Processing (1987)) has already been described. A radiation source can be frequency or amplitude modulated using a specific waveform or pattern. Thus, sinusoidal wave amplitude modulation could be employed to measure information about wave front propagation for both conventional and diffusive wave detection methods. A number of time-resolved optical imaging techniques have been developed for use with highly scattering media, ultrafast phenomena, etc. These applications exploit temporal or phase properties of the radiation field (e.g., time-of-flight, holography, heterodyne, homodyne, Raman amplification, etc.). If the EM radiation source is pulsed and the pulse length is sufficiently short, techniques such as gating can be employed in conventional TOF imaging and analysis (typically based on the "ballistic" and sometimes the "snake" component of the radiation field). The ballistic, snake, and diffuse components of the signal (the temporal profile) can each be acquired and evaluated independently if desired. Speckle and holographic interferometry imaging can also be employed (P. Hariharan, Basics of Interferometry, Academic Press, Inc. 1992; J. Briers, Laser Doppler and time-varying speckle: a reconciliation, J. Opt. Soc. Am. A, Vol. 13, No. 2, pp. 345-350, 1996). Scatter correction measurements (which may involve comparisons with measurements of neighboring beams, the use of directional, spectral, and polarization measurements, etc.) can be used to reduce noise in the detected signal in addition to any collimation in use. These scatter correction techniques have been described by Nelson, et al. in U.S. Pat. No. 4,829, 184 (5-9-89). To increase the range of the source beam, pulses of sufficient intensity can be emitted such that self-focusing effects help to channel the beam. Another technique uses a guide beam to create a channel for the source beam. Collimation of passive or active radiation can help control various imaging parameters such as temporal and spatial dimensions sampled by the beam, spectral and polarization content of the beam, coherence, and scatter. A number of collimation methods (e.g., by fiber optics, light pipes, masks, encoded or patterned apertures, mechanical apertures, reciprocating collimators, polarized filters, narrow spectral bandwidth filters, directionally-sensitive filters, spectrally-sensitive (narrow spectral bandwidth) and directionally-sensitive filters, focused lenses and mirrors (see Nelson, et al., U.S. Pat. No. 4,948,974), electronic focusing, waveguides, focused arrays, holographic or diffractive spatial filters, acousto-optical devices which exhibit high angular sensitivity, absorptive materials, etc. are available. The beam dimensions can be reduced by limiting the cross sectional area of the beam (a conventional method of collimation) and by limiting the temporal width of the beam (i.e., using a short pulse width or a short coherence length) and, thus, limiting its spatial extent along the direction of propagation.

The ability of a detection and tracking system to localize the presence of a SHFO or its affect on the local environment (for example, the object motion can produce turbulence, localized heating, a pressure wave, it can release chemicals, it casts a moving shadow which effects background signals, it can disrupt features such as a predictable background signal) due to the physical properties of the SHFO (which may result in characteristic signal patterns or signatures which can be due to a resonance condition, re-radiation, a radiation pattern which is the result of its physical structure, its material composition, Doppler effects, reflections, scattering, and absorption) can be enhanced by the use of multiple angled beams. See Image Recovery Theory and Application (H. Stark, ed. 1987). In some instances it may be desirable to alter the local environment in order to accentuate the disruptive presence of a SHFO. In some situations there may be an advantage to monitoring environmental scattered radiation since noticeable changes in the monitored scattered radiation distribution could indicate the presence of a SHFO blocking or re-scattering the scattered radiation (this represents another kind of active barrier).

Detection and tracking systems that utilize ionizing (soft x-rays, x-rays, gamma rays, and particle (typically neutron)) radiation can offer unique capabilities for detecting and tracking SHFOs. Atmospheric distortion, scattering, and absorption effects which can significantly modify the propagation path of uv, optical, infrared, and microwave radiation will (in many cases) have far less effect on ionizing radiation propagation. The angle-dependent interaction cross sections of materials used in SHFOs as well as the effective size of an SHFO (which depends on physical dimensions and shape as well as material composition, density, and distribution within the volume of the SHFO) for ionizing radiation can make the SHFO appear to be substantially larger for detection and tracking that is based on ionizing radiation rather than uv, optical, infrared, and microwave radiation (including radar radiation). A limitation to the operational range of a detection and tracking system that utilizes ionizing radiation is the need for a very intense source since in most cases the radiation from available (and affordable) sources tends to be relatively uncollimated. The useful range of such a detection and tracking system can be extended by collimating and (optionally) filtering the source beam. Source collimation might include focusing hollow fibers (capillary optics or microchannel plate optics), crystals, multilayer mirrors, lenses, etc) in addition to conventional apertures. If the collimation has a pattern, it can be made to reciprocate to reduce the effects of the pattern or to simply move the pattern (if it is desirable). Similar collimation may be used with the receiver. The radiation can intentionally be distributed using a patterned or structured geometry. Multiple sources can be employed. A receiver can measure scatter radiation and/or fluorescence (characteristic) radiation from the SHFO and the local environment. An uv, optical, infrared, or microwave beam can be used with soft x-ray, x-ray, gamma ray, or neutron radiation detection and tracking system to provide additional sampling information and/or as a safety feature to demarcate the position of the hazardous radiation beam(s). If any fluorescence radiation is in the uv, optical, infrared, or microwave wavelength range, then scattering, absorbing, and distorting properties of the obscuring medium (the atmosphere) as well as multipath issues need to be considered since these effects will modify the return signal. An advantage to detecting characteristic or scattered x-rays or gamma rays or even neutrons is that the SHFO is highly likely to be a man-made object (birds are a minor concern due to their small size, material composition and density). Detectors need not be highly focused unless positional information is desired. A further advantage is that the x-ray, gamma ray, or neutron source radiation tends to travel in a straight line with little scattering. This makes it difficult for an opponent to locate the source of the beam without directly intercepting the beam. An opponent may even have difficulty in realizing that a scanning beam is being used. Although these types of radiation represent a biological hazard, the collimated beam is intended to be well-localized for the region being scanned. It is assumed that friendly, manned SHFOs or flying objects will not operate for extended periods of time in the beam path.

Many of the detection and tracking techniques described herein for flying objects and SHFOs can be applied for active and passive underwater (an obscuring medium) EM and acoustic detection and tracking of swimming objects and surface-hugging swimming objects (SHSO). SHSOs may be moving in close proximity to the underwater terrain, man-made structures, ice, biological materials, lake, river, and ocean bottom, and the water-atmosphere interface. Multipath problems (in comparison to SHFO problems) may have an extra degree of complexity due to the presence of this water-atmosphere interface (see, for example, R. Urick, Principles of Underwater Sound, 3d edition, Chapters 5,6 (1983), McGraw-Hill) and the water-bottom interface. The detection and tracking of swimming objects and SHSOs such as frogmen (and possibly seals and dolphins), mines, submarines, autonomous swimming vehicles (ASVs), and torpedos is of particular concern in shallow water (near shore) environments such as coastal regions, rivers, lakes, and harbors. Acoustic attenuation as a function of frequency tends to limit the range at which a swimming object or SHSO of interest can be detected (in comparison to flying objects and SHFOs).

The EM and acoustic cross sections for swimming objects and SHSOs, like the EM cross sections for flying objects and SHFOs, tend to be angle-dependent as well as size and composition dependent. Multistatic acoustic detection and tracking can be implemented in the same manner as was described for multistatic EM detection and tracking. One or more sources can scan a region from multiple angles. ASVs can be used to increase the number of viewing angles and create crossed grid patterns. One or more receivers can detect the radiation. Sources and receivers can use various forms of collimation (coherent, holographic, or TOF, apertures, acoustic absorbing materials, acoustic lens). A variety of encoded waveforms can be employed which can range from pulsed to continuous (CW), including AM and FM CW. We have already discussed the need to control waveform parameters such as the signal pulse width, the collimation (including the angular distribution and the dimensions of the input beam), the spectral composition, the phase, the amplitude, and the time-dependence (in general, the coherence) of the signal as methods of encoding or restricting the properties of the radiation source. A number of phase, frequency, and noise-resistant encoded waveforms (for example, chirp pulses) have been described in the literature that was cited previously. Doppler-shifted signals can be detected. EM and acoustic diffusive wave detection and tracking can be implemented as well as scanning using two or more intersecting EM or acoustic wave fronts. Processing techniques such as matched filter and matched field filter processing, etc. can be employed to enhance received data. In addition, reference objects 455 (including acoustic guide stars) can be used to correct for propagation distortions due to the non-uniform index of refraction of the medium.

Figure 5:
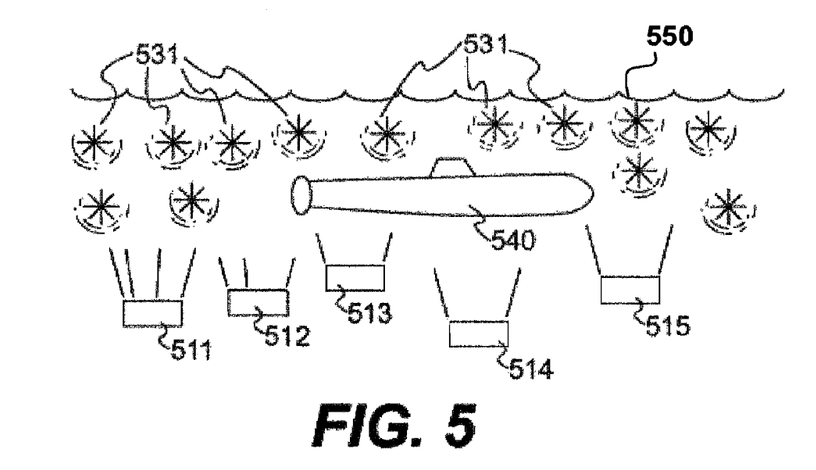
FIG. 5 is a diagram showing a local source spatial grid system combined with detectors that monitor a predictable background noise source such as snapping shrimp. A swimming object such as a submarine is shown blocking a fraction of the field of view of the acoustic detector used to monitor the local background signal from the snapping shrimp. The submarine may also displace snapping shrimp that would otherwise contribute to the integrated local background signal.

FIG. 5 is a diagram showing a local source spatial grid system 511-515 with combined detectors that monitor a predictable background noise source such as snapping shrimp 531. A swimming object such as a submarine 540 is shown blocking a fraction of the field of view of the acoustic detector used to monitor the local background signal from the snapping shrimp 531. The submarine may also displace snapping shrimp 531 that would otherwise contribute to the integrated local background signal. This local source spatial grid system exploits tomography techniques (multiple views) using relatively simple sources and detectors. Sources of underwater background noise such as snapping shrimp 531 may have predictable noise patterns that can be used in conjunction with both local and remote spatial grids. For example, the background noise signal may be blocked or diminished depending on the size and position of the swimming object and the spatial distribution of snapping shrimp 531.

A straightforward extension of this idea is to introduce a number of man-made devices in order to simulate the effect of snapping shrimp 531. It may be possible to manipulate a local population of snapping shrimp 531 so as to enhance the background noise signal. Local and remote detectors may use the modifications to the background signal to improve the quality of the detection and tracking process and/or as a trigger to activate sources that would illuminate the swimming object 540. The man-made devices used to generate background noise signals may include an artificial signal generator, and may be placed below or above the water surface 550. These background noise signals may generated by an artificial signal generator simulating a natural feature. Alternatively, background noises without a natural analogue may be produced.

Reference objects 455 for active detection and tracking systems could include devices that resemble the swimming objects or SHSOs of interest, air bubbles (which could be generated by a remotely located (and possibly remotely controlled) source of gas or a remotely controlled vehicle that releases bubbles), or biological structures such as fish, seals, etc. A passive reference object 455 can be comprised of one or more acoustic sources at fixed sites or mounted on a remotely controlled vehicle. Passive reference objects 455 can also function as reference objects for active detection and tracking systems. The advantage of employing a mobile reference object 455 is that a large number of samples can be acquired over a large region (although they need to be acquired within a time interval such that the region of concern is relatively stable). The mobile reference object 455 can be self-powered and unconstrained or it can move along a track or guide wire. An alternative is to install a sufficient number of fixed reference objects 455 such that an adequate number of samples can be acquired (within an appropriate time period). These fixed reference objects 455 need not be immobile. Simple motion such as the ability to move up and down or to rotate and tilt with respect to the mounting can be incorporated. These types of spatial sampling capabilities can also be implemented with the sources and receivers (motion, vertical adjustment, rotation, tilt). A natural extension of this idea is to endow the passive version of the reference object 455 with sufficient capability so that it functions as a source and/or a receiver. A further extension of this idea is to utilize the original source(s) and/or receiver(s) as passive and/or active reference objects 455. If a sufficient number of views are acquired a detection and tracking system (which in one of many possible implementations is located only on the periphery of the region of concern) can be used to implement tomosynthesis reconstruction techniques or CT reconstruction techniques. These passive or active reference objects 455 permit the detection and tracking system and the medium to be calibrated for acoustic and/or EM propagation (or equivalently, a series of active or passive transfer functions can be ascertained over a region of interest). Source power levels can be self-monitored for calibration purposes. Adaptive acoustic techniques can be applied to the source and/or the receivers. This could include changing the source beam pattern by using beam forming techniques or altering an acoustic lens. Transfer function information can be used for electronic modification of the data. A passive reference source can be used to improve the data base used to implement matched field processing. Passive and active detection and tracking systems can be used together. Cost factors will influence how sophisticated the detection and tracking system will be (source and receiver design, reference object design, motion capabilities, number of sources, receivers, and reference objects deployed, etc.). An alternative to the use of reference objects 455 and adaptive techniques for both local and remote source spatial grid techniques is to monitor how the returned signals vary over time. Changes in statistical trends of signal patterns for individual grid elements as well as correlated changes between grid elements may be attributed to environmental causes or the presence of a man-made object (for example, its shape, size, speed and motion patterns, and attenuation properties).

Though the invention has been described with respect to specific embodiments thereof, many variations and modifications will immediately become apparent to those skilled in the art. It is therefore the intention that the appended claims be interpreted as broadly as possible in view of the prior art to include all such variations and modifications. It will be understood that many additional changes in the details, materials, steps and arrangement of parts, which have been herein described and illustrated to explain the nature of the invention, may be made by those skilled in the art within the principal and scope of the invention as expressed in the appended claims.

What is claimed is:

1. An apparatus for spatial encoding of a search space comprising:
    at least one radiation source capable of providing a predetermined type of radiation in the form of a plurality of beams arrayed along at least one directional axis, the beams arranged in successive alignment to exhibit a directional component characterized by a frequency variance between successive beams in accordance with direction and disposed so radiation therefrom propagates within the search space;
    at least one radiation detector capable of detecting the predetermined type of radiation and disposed to detect at least the predetermined type of radiation; and
    at least one additional and separate radiation detector provided to measure background noise signals by detecting a non-uniform index of refraction distribution.

2. The apparatus of claim 1, further comprising:
    the radiation source providing at least one of electromagnetic (EM) radiation, ionizing radiation, and acoustic radiation.

3. The apparatus of claim 1, wherein the radiation source provides an encoded waveform comprising one of wavelength, time of flight (TOF), waveform, polarization and phase.

4. The apparatus of claim 3, further comprising the encoded waveform provided as a spatial grid formed by said plurality of beams arrayed along the directional axis.

5. The apparatus of claim 4, wherein the spatial grid is a remote source spatial grid.

6. The apparatus of claim 4, wherein the spatial grid is a local source spatial grid.

7. The apparatus of claim 1, wherein at least one radiation source is mobile.

8. The apparatus of claim 1, further comprising at least one reference object disposed for calibrating the search space.

9. The apparatus of claim 1,
    wherein the background noise signals are generated by natural features including snapping shrimp.

10. The apparatus of claim 1, further comprising:
    at least one radiation detector provided to measure background noise signals; wherein the background noise signals are generated by an artificial signal generator.

11. The apparatus of claim 1, further comprising:
    at least one radiation detector provided to measure background noise signals; wherein the background noise signals are generated by an artificial signal generator simulating a natural feature.

12. The apparatus of claim 1, further comprising:
    a second radiation source capable of providing a predetermined type of radiation in the form of a plurality of beams arrayed along at least one directional axis, the beams arranged in successive alignment to exhibit a directional component characterized by a frequency variance between successive beams in accordance with direction and disposed so radiation therefrom propagates within the search space, wherein the beams provided by the radiation source and the second radiation source are configured to create a grid of coherent crossed beams in the search space.

13. A method for detecting and tracking an object within a search space, the method comprising:

providing, from at least one radiation source, a predetermined type of radiation in the form of a plurality of beams arrayed along at least one directional axis, the beams arranged in successive alignment to exhibit a directional component characterized by a frequency variance between successive beams in accordance with direction and disposed so radiation therefrom propagates within the search space;

using at least one radiation detector to detect the predetermined type of radiation;

using a second radiation detector to measure background noise signals by detecting non-uniform index of refraction distribution; and using a natural feature as background noise signals.

14. The method of claim 13, further comprising providing at least one of EM radiation, ionizing radiation, and acoustic radiation.

15. The method of claim 13, further comprising causing the radiation to propagate within the search space, so as to allow detection by at least one radiation detector associated with the at least one radiation source and disposed to detect at least one of EM radiation, ionizing radiation, and acoustic radiation.

16. The method of claim 15, further comprising providing the encoded waveform as a spatial grid.

17. The method of claim 13, further comprising:

using an artificial signal generator to generate the background noise signals such that the background noise signals at least partially simulate a natural feature.

18. The method of claim 13, further comprising:

using a second radiation source for providing a predetermined type of radiation in the form of a plurality of beams arrayed along at least one directional axis, the beams arranged in successive alignment to exhibit a directional component characterized by a frequency variance between successive beams in accordance with direction and disposed so radiation therefrom propagates within the search space, wherein the beams provided by the radiation source and the second radiation source are configured to create a grid of coherent crossed beams in the search space.

* * * * *